United States Patent [19]

Shiraishi et al.

[11] Patent Number: 5,136,507
[45] Date of Patent: Aug. 4, 1992

[54] SYSTEM FOR CORRECTIVELY CONTROLLING TURNING MOVEMENT OF VEHICLE

[75] Inventors: Shuji Shiraishi; Osamu Yamamoto; Mitsuya Serizawa; Makoto Sato; Keiyu Kin; Hiromi Inagaki; Wataru Saito; Yoshimitsu Akuta, all of Saitama, Japan

[73] Assignee: Honda Giken Kogyo Kabushiki Kaisha, Tokyo, Japan

[21] Appl. No.: 531,725

[22] Filed: Jun. 1, 1990

[51] Int. Cl.$^5$ ............................................. B62D 6/04
[52] U.S. Cl. ................................. 364/424.05; 180/142
[58] Field of Search ................... 364/424.05; 180/140, 180/141, 142, 143, 79.1; 280/91

[56] References Cited

U.S. PATENT DOCUMENTS

| | | | |
|---|---|---|---|
| 4,412,594 | 11/1983 | Furukawa et al. | 180/142 |
| 4,666,013 | 5/1987 | Shibahata et al. | 180/142 |
| 4,690,431 | 9/1987 | Ito et al. | 180/142 |
| 4,706,771 | 11/1987 | Kawabe et al. | 180/142 |
| 4,718,685 | 1/1988 | Kawabe et al. | 180/142 |
| 4,840,389 | 6/1989 | Kawabe et al. | 180/140 |
| 4,998,593 | 3/1991 | Karnopp et al. | 180/141 |
| 5,001,636 | 3/1991 | Shiraishi et al. | 180/142 |
| 5,019,982 | 5/1991 | Furukawa | 180/140 |

Primary Examiner—Gary Chin
Attorney, Agent, or Firm—Armstrong & Kubovcik

[57] ABSTRACT

A system for correctively controlling the turning movement of a vehicle, including a device for correcting the turning movement of the vehicle, a sensor for detecting the steering angle of a steering wheel of the vehicle, a steering angle hysteresis storage device for storing the hysteresis of the steering angle, and a reference value arithmetic device for determining a reference value of a physical quantity generated during a turning movement of the vehicle, on the basis of the hysteresis of the steering angle. The system also includes a detector for detecting an actual value of the physical quantity during the turning movement, a calculator for determining a deviation between the reference value and actual value of the physical quantity and a polarity of the deviation, and a control-quantity determining device for determining a control-quantity for the turning movement correcting device on the basis of the deviation obtained in the calculator. A device is included for determining a control-direction of correction of the turning movement on the basis of the polarity of the deviation. This system permits the turning movement of the vehicle to be automatically corrected.

6 Claims, 6 Drawing Sheets

Under-steering in
rightward turning (Dr > 0)

Over-steering in
rightward turning (Dr < 0)

Under-steering in
leftward turning (Dr < 0)

Over-steering in
leftward turning (Dr > 0)

SYSTEM FOR CORRECTIVELY CONTROLLING TURNING MOVEMENT OF VEHICLE

BACKGROUND OF THE INVENTION

1. Field of the Invention

The field of the present invention is systems for correctively controlling the turning movement of a vehicle.

2. Description of the Prior Art

For an under-steering phenomenon or an over-steering phenomenon which may be generated as a result of steering operation during a cruising operation of a vehicle, there have been realized no techniques other than those by which a correctively steering operation is conducted by an operator or driver himself, and the development of a system which enables an automatic correction of the turning movement of a vehicle is desired.

SUMMARY OF THE INVENTION

The present invention has been accomplished with the above circumstances in view, and it is an object of the present invention to provide a system for correctively controlling the turning movement of a vehicle, wherein the above problem can be overcome by calculating a reference value of a physical quantity generated during a turning movement of the vehicle and automatically correcting the turning movement on the basis of the reference value.

To achieve the above object, a system for correctively controlling the turning movement of a vehicle according to the present invention comprises a turning movement correcting means for correcting the turning movement of the vehicle, a steering-angle sensor for detecting a steering angle of a steering wheel of the vehicle, a steering-angle hysteresis storage means for storing the hysteresis of the steering angle, a turning movement reference value arithmetic means for determining a reference value of a physical quantity generated during a turning movement of the vehicle on the basis of the hysteresis of the steering angle, a detecting means for detecting an actual value of the physical quantity during the turning movement of the vehicle, a calculating means for determining a deviation between the reference value and actual value of the physical quantity and a polarity of the deviation, a control-quantity determining means for determining a control-quantity with respect to the turning movement correcting means on the basis of the deviation obtained in the calculating means, a control-direction determining means for determining a corrective control-direction of the turning movement correcting means on the basis of the polarity of the deviation obtained in the calculating means.

With such construction, the reference value of the physical quantity generated during the turning movement of the vehicle is calculated, and the turning movement correcting means is controlled in accordance with the polarized deviation between such calculated reference value and the actual detected physical quantity, whereby the turning movement of the vehicle can be automatically corrected.

The above and other objects, features and advantages of the invention will become apparent from a reading of the following description of preferred embodiments, taken in conjunction with the accompanying drawings.

BRIEF DESCRIPTION OF THE DRAWINGS

Figs. 1 to 3 illustrate a first embodiment of the present invention, wherein

FIG. 1 is a general block diagram of a system of the first embodiment;

FIG. 2 is a graph illustrating one example of an output characteristic of an arithmetic parameter selecting circuit;

FIGS $3a$-$3d$ are the diagrams illustrating deviations depending upon under-steering and over-steering conditions during leftward and rightward turning movements of a vehicle.

DESCRIPTION OF THE PREFERRED EMBODIMENTS

The present invention will now be described by way of embodiments with reference to the accompanying drawings.

Figure 1:
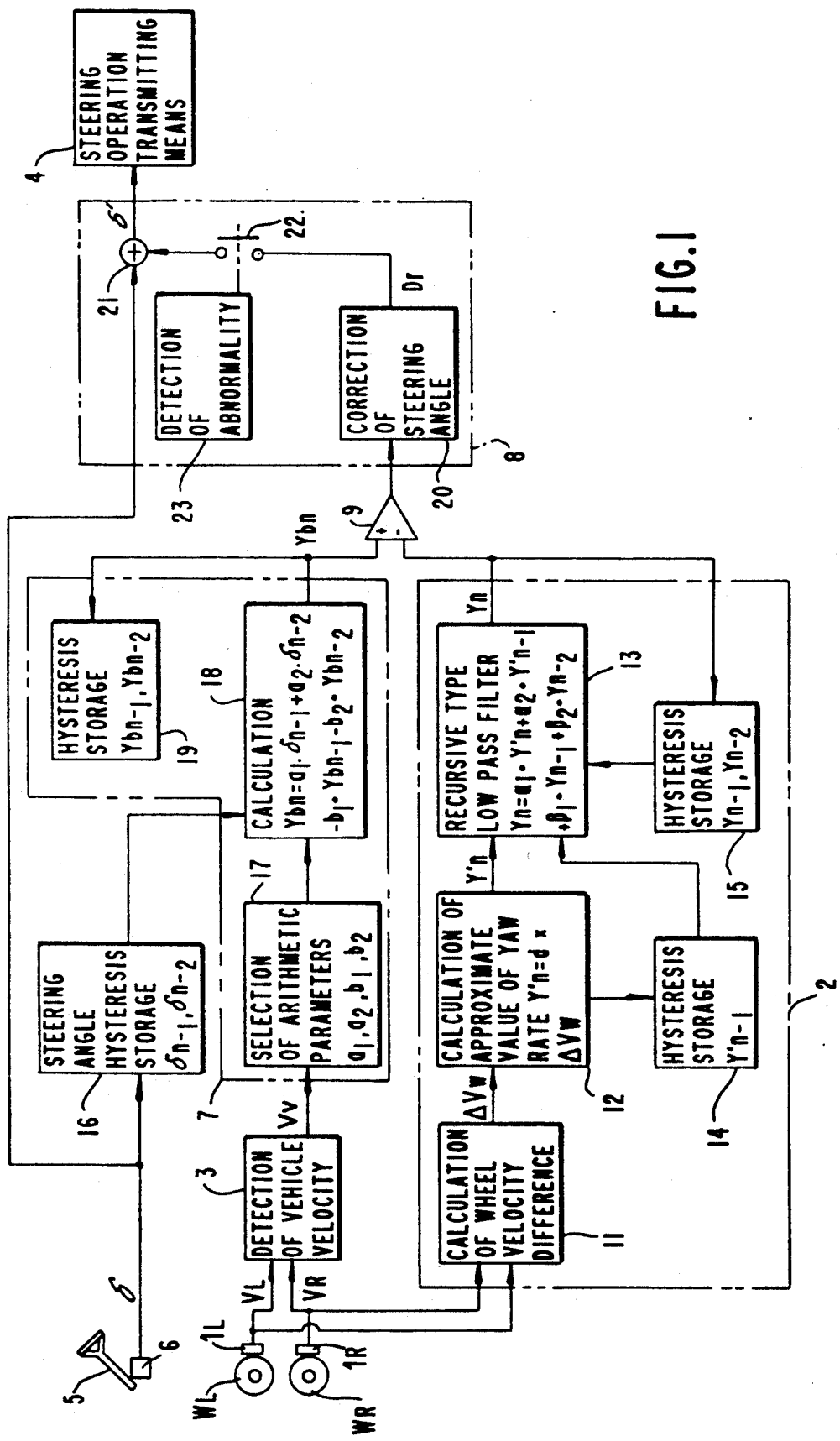

Referring first to FIG. 1 illustrating a first embodiment of the present invention, velocity sensors $1_L$ and $1_R$ are independently mounted on left and right freely rotating wheels $W_L$ and $W_R$ of a vehicle (e.g., rear wheels in a front wheel drive vehicle), respectively, so that the velocities $V_L$ and $V_R$ detected by the velocity sensors $1_L$ and $1_R$ are inputted into a yaw rate detector means 2 for detecting the yaw rate as a physical quantity generated during a turning movement of the vehicle and a vehicle velocity detector 3, respectively. Front wheels as wheels to be steered by an operator or driver for the vehicle are steered through a steering driving means 4 which also serves as a turning movement correcting means. A signal which is obtained by correcting a steering angle 6 of a steering wheel 5 in accordance with driver's operation of the steering wheel is inputted into the steering driving means 4, so that the steering driving means 4 is operated in accordance with such inputted signal. More specifically, the steering angle δ detected by a steering angle sensor 6 mounted on the steering wheel 5 is corrected by a steering angle correcting means 8 which also serves as a control-quantity determining means and as a control-direction determining means, and a correcting steering-angle δ is inputted into the steering driving means 4.

The steering angle δ detected by the steering-angle sensor 6 and a vehicle velocity Vv provided by the vehicle velocity detector 3 are inputted into a reference yaw rate arithmetic means 7 serving as a turning movement reference value arithmetic means. Thus, a reference yaw rate $Yb_n$ as a reference value of a physical quantity is obtained in the reference yaw rate arithmetic means 7, and this reference yaw rate $Yb_n$ and a yaw rate $Y_n$ obtained in the yaw rate detecting means 2 are inputted into a calculating means 9. In this calculating means 9, a deviation Dr ($=Yb_n-Y_n$) between the reference yaw rate $Yb_n$ and the yaw rate $Y_n$ is obtained by polarity encoding (+ or −). The deviation Dr is inputted into the steering-angle correcting means 8 which produces a signal indicative of correction on the basis of the encoded deviation Dr.

The yaw rate detecting means 2 comprises a wheel velocity-difference arithmetic circuit 11, a yaw rate approximate value arithmetic circuit 12, a recursive type low-pass filter 13, a hysteresis storage circuit 14 for storing the last value $Y'_{n-1}$ of L a yaw rate approximate value $Y'_n$ obtained in the yaw rate approximate value arithmetic circuit 12, and a hysteresis storage circuit 15 for storing the last value $Y_{n-1}$ and the last but one value $Y_{n-2}$ of a yaw rate actual value $Y_n$ obtained in the recursive type low-pass filter 13.

The wheel velocity-difference arithmetic circuit 11 provides a difference $\Delta V_W (= V_R - V_L)$ between the wheel velocities $V_L$ and $V_R$ detected by the velocity sensors $1_L$ and $1_R$, and in the yaw rate approximate value arithmetic circuit 12, a yaw rate approximate value $Y'_n$ $(= d \times \Delta V_W)$ is obtained from the difference $\Delta V_W$ multiplied by a given proportionality factor d. Here, the proportionality factor d is a tread width of the freely rotating wheel $W_L$ and $W_R$, e.g., d = 1. The recursive type low-pass filter 13 eliminates an influence on the wheel velocities $V_L$ and $V_R$ due to the vibration of a vehicle suspension. It should be noted that fluctuation of the wheel velocities $V_L$ and $V_R$ due to the resonance with vibratory movements of the suspension during travelling on a bad road is about 10 Hz, and the range of frequency of the yaw rate used for controlling the vehicle turning movement is 0 - 2 Hz. Therefore, the recursive type low-pass filter 13 is constructed to filter the approximate value of yaw rate $Y'_n$ in a damping range of 2 Hz or more. Particularly, in the recursive type low-pass filter 13, the arithmetic of the following expression (1)., wherein an output value from the filter 13 is represented by $Y_n$, is carried out on the basis of signals from the yaw rate approximate value arithmetic circuit 12 and the hysteresis storage circuits 14 and 15:

$$Y_n = a_1 \cdot Y'_n + a_2 \cdot Y'_{n-1} + \beta_1 \cdot Y_{n-1} + \beta_2 \cdot Y_{n2} \quad (1)$$

wherein $\alpha_1$, $\alpha_2$, $\beta_1$ and $\beta_2$ are constants determined by the result of an experiment. In addition, the suffixes n --- n−2 represent the present and last values and the like at a given cycle at which the arithmetic in filtering is repeated.

The vehicle velocity detector 3 outputs a vehicle velocity Vv on the basis of the wheel velocities $V_L$ and $V_R$ is outputted as a vehicle velocity Vv. The steering angle δ obtained in the steering-angle sensor 6 is inputted into a steering-angle hysteresis storage means 16 where the last value $\delta_{n-1}$ and the last but one value $\delta_{n-2}$ of the steering angle δ are stored.

The reference yaw rate arithmetic means 7 comprises an arithmetic parameter selecting circuit 17, an arithmetic circuit 18 for calculating the reference yaw rate $Yb_n$, and a reference yaw rate hysteresis storage circuit 19 for storing the last value $Yb_{n-1}$ and the last value $Yb_{n-2}$ of the reference yaw rate $Yb_n$ obtained in the arithmetic circuit 18.

Figure 2:
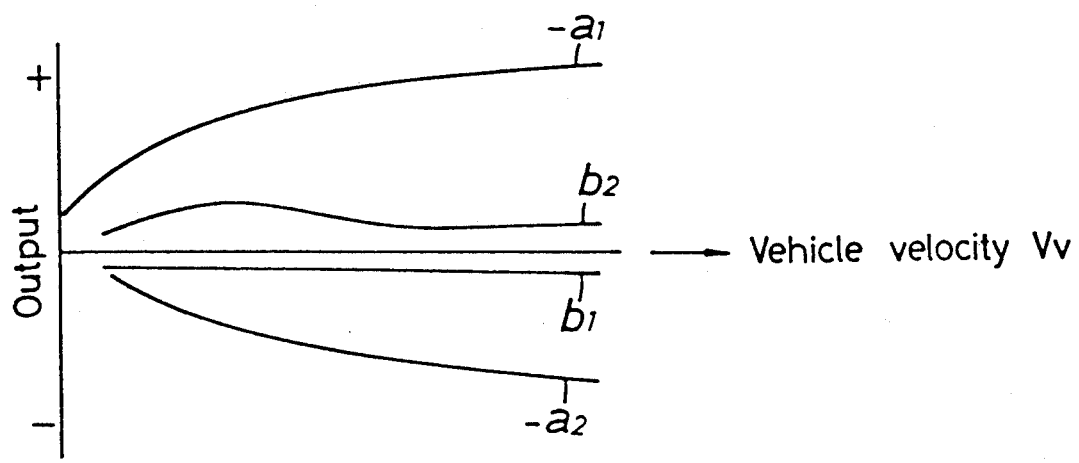

The arithmetic parameter selecting circuit 17 selects arithmetic parameters $a_1$, $a_2$, $b_1$ and $b_2$ used for the calculation in the arithmetic circuit 18 in accordance with the vehicle velocity Vv obtained in the vehicle speed detector 3, so that values of the individual arithmetic parameter $a_1$, $a_2$, $b_1$ and $b_2$ determined, for example as shown in FIG. 2, are inputted into the arithmetic circuit 18 in accordance with each vehicle velocity.

The arithmetic circuit 18 calculates the present reference yaw rate $Yb_n$ on the basis of a hysteresis of the steering angle δ from the steering-angle hysteresis storage means 16 and a hysteresis of the reference yaw rate $Yb_n$ from the reference yaw rate hysteresis storage circuit 19, the calculation according to the following expression (2) being carried out:

$$Yb_n = a_1 \cdot \delta_{n-1} + a_2 \cdot \delta_{n-2} - b_1 \cdot Yb_{n-1} - b_2 \cdot Yb_{n-2} \quad (2)$$

The calculating means 9 calculates a deviation Dr between actual yaw rate value Yn and the reference yaw rate $Yb_n$. In under-steering and over-steering conditions during leftward and rightward turning movements of the vehicle as shown in FIG. 3, the deviation Dr having a positive (+) or negative (−) polarity from the calculating means 9 is inputted into the steering-angle correcting means 8. The actual yaw rate value Yn is shown by a solid line and the reference yaw rate $Yb_n$ is shown by a broken line in FIG. 3.

Figure 3A:
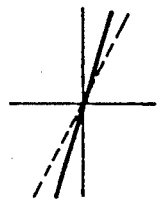
Figure 3B:
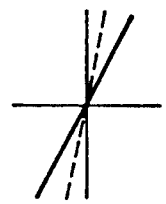
Figure 3C:
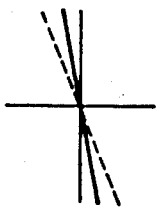
Figure 3D:
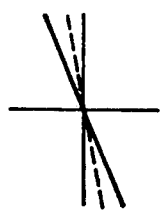

The steering-angle correcting means 8 comprises a correcting steering-angle signal producing circuit 20 for producing a steering-angle correcting signal corresponding to the encoded deviation Dr received from the calculating means 9, so that the steering angle δ is corrected at an adding point 21 according to the correcting signal from the correcting steering-angle signal producing circuit 20. Moreover, the correcting steering-angle signal producing circuit 20 produces a steering-angle correction signal in which a direction of correcting steering-angle is determined in correspondence with the polarity (+ or −) of the deviation Dr. Thus, when the deviation Dr has a positive (+) polarity as shown in FIGS. 3a and 3d, a signal indicative of a command to correct the steering angle to the rightward turning side is produced from the correcting steering angle signal producing circuit 20, and when the deviation Dr has a negative (−) polarity as shown in FIGS. 3b and 3c, a signal indicative of a command to correct the steering angle to the leftward turning side is produced from the correcting steering-angle signal producing circuit 20.

The steering-angle correcting means 8 also comprises a switch 22 interposed between the adding point 21 and the steering-angle correcting signal producing circuit 20. The switch 22 is adapted to be cut off when an abnormality detecting circuit 23 has detected an abnormality such as a trouble of an electric circuit.

The operation of this first embodiment will be described below. The deviation Dr between the yaw rate $Y_n$ obtained in the yaw rate detecting means 2 and the reference yaw rate $Yb_n$ obtained in the reference yaw rate arithmetic means 7 is calculated in a polarized (+, −) manner in the calculating means 9, and the steering angle δ is corrected in the steering-angle correcting means 8 on the basis of the resulting deviation Dr. This causes the steering-angle for the vehicle to be automatically controlled for correction.

Thus, the reference yaw rate $Yb_n$ as a reference value of the physical quantity generated during turning of the vehicle is calculated, and the steering-angle is controlled so as to approximate the calculated value of the reference yaw rate. Therefore, it is unnecessary to make a data table for every parameter in controlling the steering-angle. Further, since the data table is unnecessary, only a relatively small memory capacity in a controlling computer is required.

In the above embodiment, the vehicle whose front wheels are steered has been described, but it will be understood that the above-described embodiment is also applicable to a four wheel-steered vehicle where any of its front and rear wheels are steered.

Figure 4:
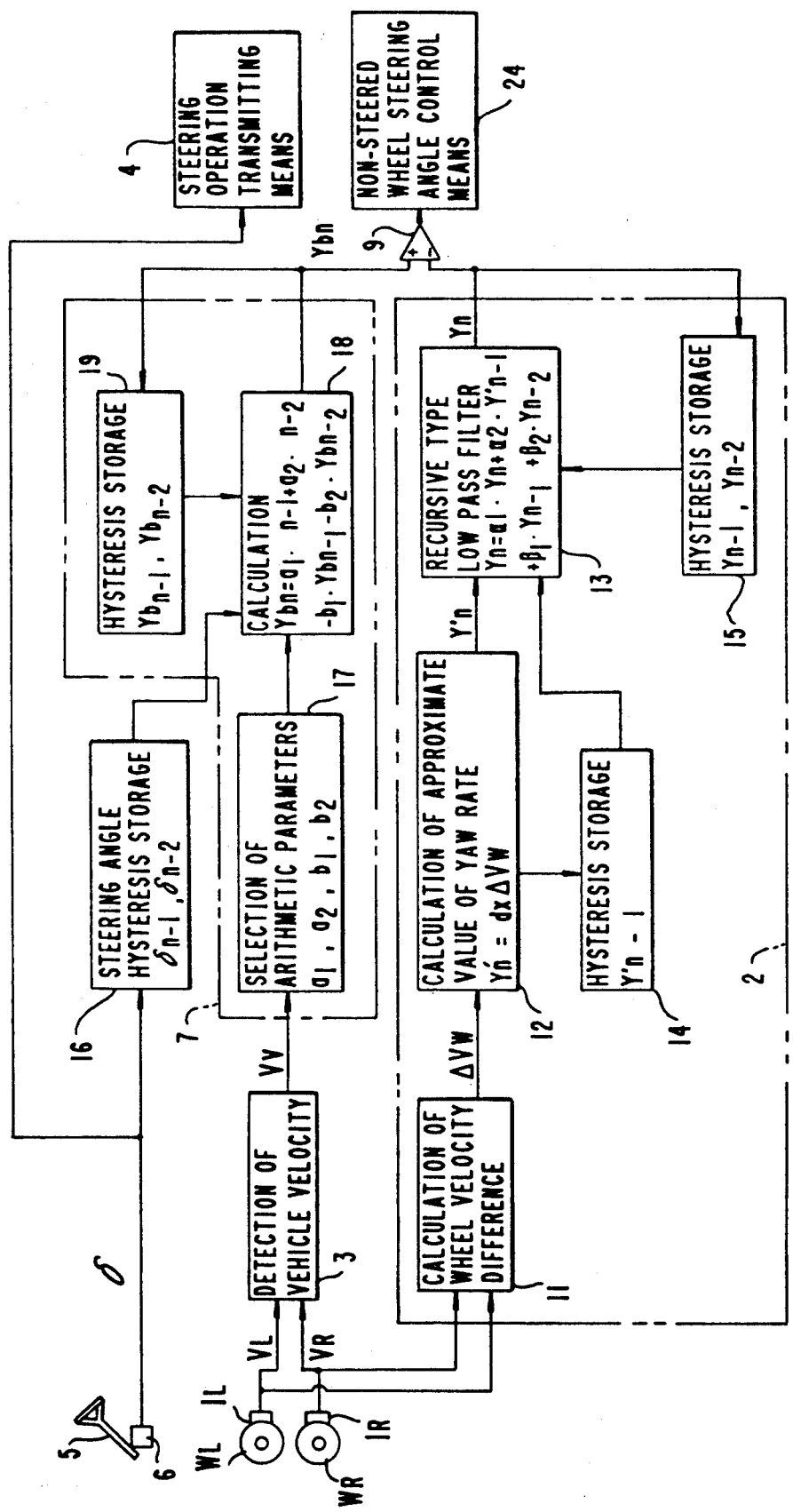
FIGS. 4, 5 and 6 are general block diagrams similar to FIG. 1, but illustrating second, third and fourth embodiments of the present invention, respectively.

FIG. 4 illustrates a second embodiment of the present invention, wherein components corresponding to those in the above-described embodiment are designated by the same reference characters.

Wheels to be steered by an operator or driver of a vehicle, i.e., front wheels, are steered through a steering operation transmitting means 4 in accordance with the steering-angle $\delta$, and non-steered wheels which are not controlled by the operator, i.e., rear wheels, are controlled in steering-angle by a non-steered wheel steering-angle control means 24 which also serves as a control-quantity determining means, a control-direction determining means and a turning movement correcting means. A polarized deviation Dr from a calculating means 9 is inputted into the non-steered wheel steering-angle control means 24.

According to the second embodiment, the steering angle for the non-steered wheels is controlled by a level corresponding to the output deviation Dr produced from the calculating means 9, whereby the yaw rate $Y_n$ of the vehicle is controlled so as to approximate the reference yaw rate $Yb_n$. However, as in the previously described first embodiment, it is unnecessary to make a data table, and only a relatively small memory capacity in a controlling computer is required.

Figure 5:
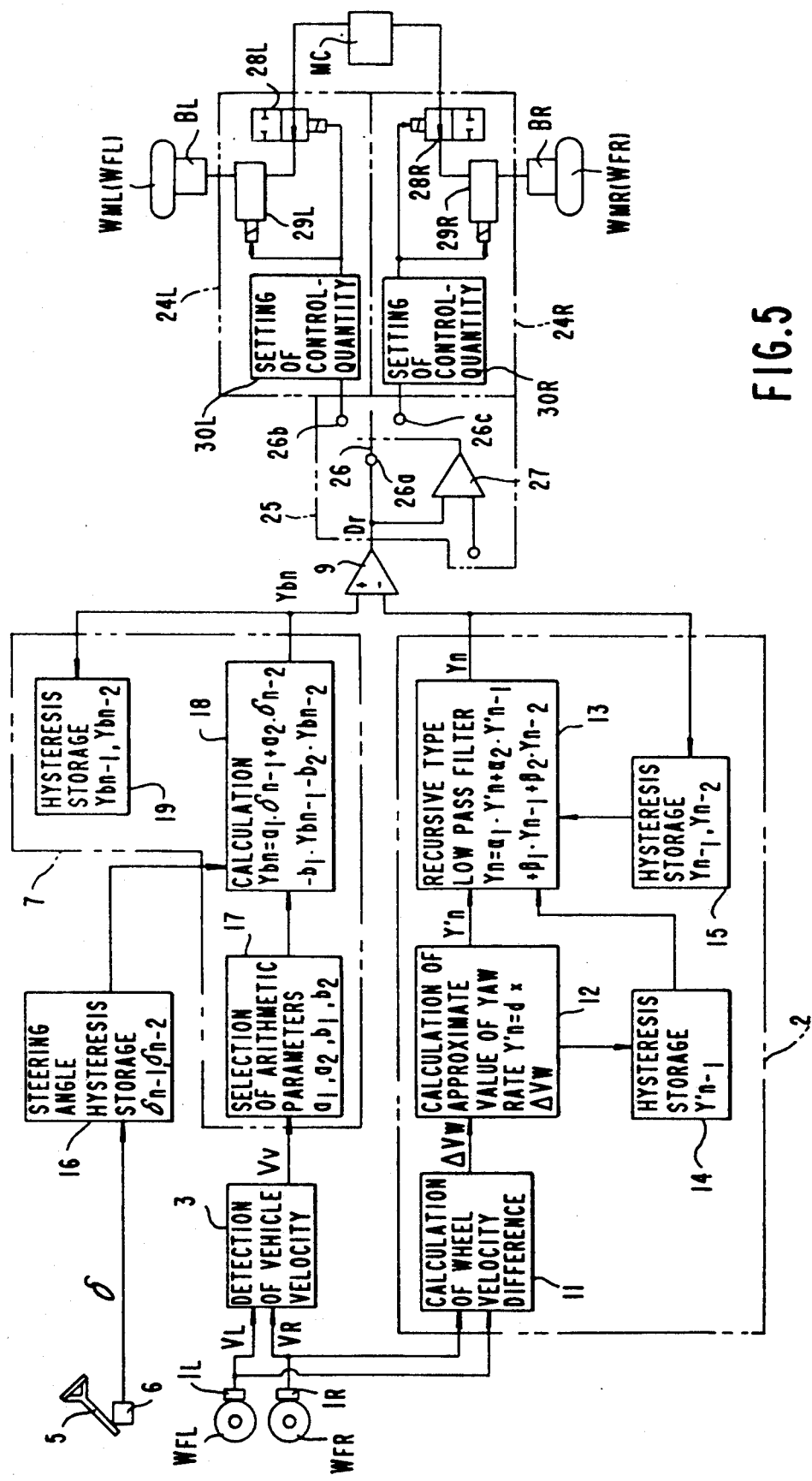

FIG. 5 illustrates a third embodiment of the present invention, wherein components corresponding to the previous embodiments are denoted by the same reference characters.

Brakes $B_L$ and $B_R$ as turning movement correcting means which are independently controllable are mounted on left and right drive wheels $W_{ML}$ and $W_{MR}$ and the left and right freely rotating wheels $W_{FL}$ and $W_{FR}$, respectively, so that a hydraulic braking pressure supplied from a master cylinder MC to the brakes $B_L$ and $B_R$ is controlled by left and right hydraulic braking pressure control means $24_L$ and $24_R$, respectively.

A polarized output deviation Dr produced from the calculating means 9 is connected through a control-direction determining means 25 to the left and right hydraulic braking pressure control means $24_L$ and $24_R$, and a comparator 27 for changing the switching mode of the switch 26. The comparator 27 is intended to judge whether the output deviation Dr from the calculating means 9 is positive or negative, so that when the polarity of the output deviation Dr is positive, i.e., "+", the switch 26 is brought into a switching mode where the separate contact 26c connected to the right hydraulic braking pressure control means $24_R$ is connected to the common contact 26a, and when the deviation Dr is negative, i.e., "−", the switch 26 is brought into a switching mode where the separate contact 26b connected to the left hydraulic braking pressure control means $24_L$ is connected to the common contact 26a.

Each of the hydraulic braking pressure control means $24_L$ and $24_R$ comprises an on-off valve $28_L$, $28_R$ interposed between the master cylinder MC and the brake $B_L$, $B_R$, and a control-quantity determining means $30_L$, $30_R$ for controlling the operations of the valves $28_L$, $28_R$ and $29_L$, $29_R$, respectively. A control-quantity corresponding to the input deviation Dr received from the calculating means 9 is set in the control-quantity determining means $30_L$, $30_R$. When connected to the calculating means 9, the control-quantity determining means $30_L$, $30_R$ opens the corresponding on-off valve $28^L$, $28_R$ and controls the operation of the corresponding control value $29_L$, $29_R$ to supply a braking pressure corresponding to the deviation Dr to the brake $b_L$, $B_R$.

Such control-direction determining means 25 and braking pressure control means $24_L$ and $24_R$ ensures that when the deviation Dr has a positive (+) polarity as shown in FIGS. 3a and 3d illustrating the first embodiment, the right brake $B_R$ is operated for braking to correct the steering angle to the right turning side, and when the deviation Dr has a negative (−) polarity as shown in FIGS. 3b and 3c, the left brake $B_L$ is operated for braking to correct the steering-angle to the left turning side.

According to the third embodiment, the encoded deviation Dr between the yaw rate $Y_n$ obtained in the yaw rate detecting means 2 and the reference yaw rate $Yb_n$ obtained in the reference yaw rate arithmetic means 7 is calculated in the calculating means 9, and one of the left and right brakes $B_L$ and $B_R$ is operated for braking on the basis of such encoded deviation Dr.

Thus, the reference yaw rate $Yb_n$ as a reference value of a physical quantity generated during turning movement of the vehicle is calculated, and the turning movement is corrected so as to approach such calculated value and thus automatically corrected without corrective steering by the operator.

Figure 6:
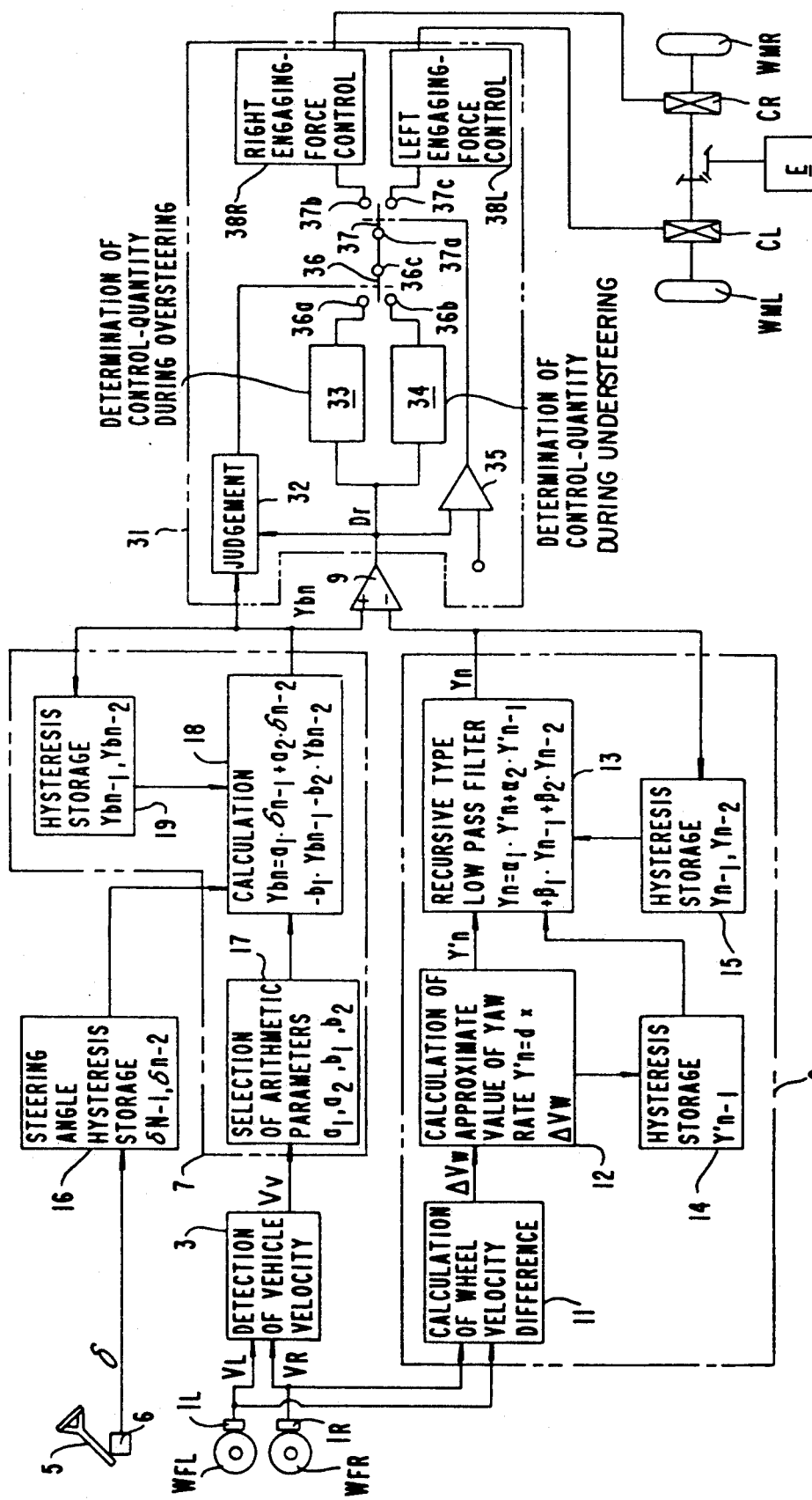

FIG. 6 illustrates a fourth embodiment of the present invention, wherein components corresponding to those in the previous embodiments are designated by the same reference characters.

Hydraulic clutches $C_L$ and $C_R$ as turning movement correcting means which are capable of freely controlling the engaging force are interposed between the left and right drive wheels $W_{ML}$ and $W_{MR}$ and an engine E, and the transmitting torque of the hydraulic clutches $C_L$ and $C_R$ is controlled by a transmitting torque control means 31.

An output encoded deviation Dr produced from the calculating means 9 and a reference yaw rate $Yb_n$ obtained in the reference yaw rate arithmetic means 7 are inputted into the transmitting torque control means 31. The transmitting torque control means 31 comprises a judging means 32 for judging whether the vehicle is in an over-steering condition or in an under-steering condition from the reference yaw rate $Yb_n$ and the deviation Dr, a during-over-steering control-quantity determining means 33 and a during-under-steering control-quantity determining means 34 having a present control quantity in accordance with the deviation Dr, a control-direction determining means 35 for determining the correcting control direction by judgment of the positive or negative (+ or −) of the polarity of the deviation Dr, a switch 36 whose switching mode is changed on the basis of an output from the judging means 32, a switch 37 which is connected in series to the switch 36 and whose switching mode is changed on the basis of an output from the control-direction determining means 35, a right-engaging-force control means $38_R$ interposed between the engine E and the right drive wheel $W_{MR}$, and a left engaging-force control means $38_l$ for controlling the transmitting torque of the hydraulic clutch $C_L$ interposed between the engine E and the left drive wheel $W_{ML}$.

The switch 36 includes a separate contact 36a connected to the during-over-steering control-quantity determining means 33, a separate contact 36b connected to the during-under-steering control-quantity determining means 34, and a common contact 36c. When it has been decided in the judging means 32 that the vehicle is in the over-steering condition, the switch 36 is brought into a mode where the separate contact 36a is connected to the common contact 36c, and when it has been decided in the judging means 32 that the vehicle is in the under-steering condition, the switch 36 is brought into a mode where the separate contact 36b is connected to the common contact 36c. The switch 37 includes a common contact 37a connected to the common contact 36c of the switch 36, a separate contact 37b connected to the right engaging-force control means $38_R$, and a separate contact 37c connected to the left engaging-force control means $38_L$. When the output from the control-direction determining means 35 is at a high level, i.e., the deviation Dr has a positive (+) polarity, the switch 37 is brought into a mode where the common contact 37a is connected to the separate contact 37b, and is brought into a mode where the L. common contact 37a is connected to the separate contact 37c.

It should be noted that in the judging means 32, a judging criterion as given in the following table is determined by the deviation Dr and the reference yaw rate $Yb_n$. The result of judgment according to such judging criterion is outputted from the judging means 32.

TABLE

| $Yb_n$ | Dr | |
|---|---|---|
| | Positive | Negative |
| Positive | O | U |
| Negative | U | O |

In this table, the character O indicates the over-steering condition, and the character U indicates the under steering condition.

The right and left engaging-force control means $38_R$ and $38_L$ produce a control signal indicative of a command to reduce the corresponding engaging force for the hydraulic clutch $C_R$, $C_L$, i.e., the transmitting torque on the basis of a control quantity determined in the control-quantity determining means 34, 34 when the signals from the during-over-steering or during-under-steering control-quantity determining means 33 or 34 have been received thereinto, and produce a control signal indicative of a command to maximize the engaging force for the corresponding hydraulic clutch $C_R$, $C_L$, i.e., the transmitting torque, when the signals from the during-over-steering and during-under-steering control-quantity determining means 33 and 34 have not been received thereinto.

The operation of the fourth embodiment will be described below. An encoded deviation Dr between the yaw rate Yn and the reference yaw rate $Yb_n$ is calculated in the calculating means 9, and the engaging force for one of the left and right hydraulic clutches $C_R$ and $C_L$ is reduced on the basis of such calculated deviation Dr. Specifically, when the deviation Dr has a positive (+) polarity as shown in FIGS. 3a and 3d, the engaging force for the right hydraulic clutch $C_R$ is reduced to correct the steering angle to the right turning side, and when the deviation Dr has a negative (−) polarity as shown in FIGS. 3b and 3c, the engaging force for the left hydraulic clutch $C_L$ is reduced to correct the steering angle to the left turning side.

Thus, the reference yaw rate $Yb_n$ as a reference value of a physical quantity generated during a turning movement of the vehicle is calculated, and the turning movement is corrected so as to approach such calculated value and thus automatically corrected without corrective steering by the operation. Moreover, it is unnecessary to make a data table for every parameter and correspondingly, only a relatively small memory region is required.

What is claimed is:

1. A system for correctively controlling the turning movement of a vehicle, comprising:

a turning movement correcting means for correcting the turning movement of the vehicle by correcting a steering angle for the vehicle;

a steering-angle sensor for detecting a steering angle of a steering wheel of the vehicle;

a steering-angle hysteresis storage means for storing data which represents a hysteresis of said steering angle of the steering wheel;

a turning movement reference value arithmetic means for determining a reference value of a physical quantity of yaw rate generated during said turning movement of the vehicle on the basis of said hysteresis of the steering angle;

a detecting means for detecting an actual value of the physical quantity during said turning movement of the vehicle;

a calculating means for determining a deviation between the reference value and actual value of said physical quantity and a polarity of the deviation;

a control-quantity determining means for determining a control-quantity which represents a degree of correction of the steering angle for the vehicle by said turning movement correcting means on the basis of the deviation obtained in said calculating means; and a control direction determining means for determining a control-direction of correction of the steering angle for the vehicle on the basis of the polarity of the deviation obtained in said calculating means.

2. A system for correctively controlling the turning movement of a vehicle according to claim 1, wherein said turning movement correcting means is disposed to correct the steering angle for rear wheels.

3. A system for correctively controlling the turning movement of a vehicle according to claim 1, wherein the vehicle has front wheels and rear wheels, the front wheels being steered directly in accordance with the steering angle of the steering wheel while the steering of the rear wheels is controlled by said turning movement correcting means.

4. A system for correctively controlling the turning movement of a vehicle, comprising:

a turning movement correcting means for correcting the turning movement of the vehicle by controlling a drive force for each of left and right wheels independently from each other;

a steering-angle sensor for detecting a steering angle of a steering wheel of the vehicle;

a steering-angle hysteresis storage means for storing data which represents a hysteresis of said steering angle;

a turning movement reference value arithmetic means for determining a reference value of a physical quantity of yaw rate generated during said turning movement of the vehicle on the basis of said hysteresis of the steering angle;

a detecting means for detecting an actual value of the physical quantity during said turning movement of the vehicle;

a calculating means for determining a deviation between the reference value and actual value of said physical quantity and a polarity of the deviation;

a control-quantity determining means for determining a control-quantity which represents a degree of control of said drive force for each wheel by said turning movement correcting means on the basis of the deviation obtained in said calculating means; and a control direction determining means for determining a control-direction of said turning movement by selecting one of the left and right wheels which should be controlled by its drive force, on the basis of the polarity of the deviation obtained in said calculating means.

5. A system for correctively controlling the turning movement of a vehicle according to claim 4, wherein said turning movement correcting means comprises brakes which are mounted on the left and right wheels respectively in such a manner that they are independently controllable to correct the turning movement in response to said control quantity and said control direction.

6. A system for correctively controlling the turning movement of a vehicle according to claim 4, wherein said turning movement correcting means comprises hydraulic clutches which are interposed between the left and right drive wheels and an engine, respectively, and correct the turning movement in response to said control quantity and said control direction.

* * * * *